United States Patent [19]
Cheng et al.

[11] Patent Number: 5,963,628
[45] Date of Patent: Oct. 5, 1999

[54] REINFORCEMENT PAY PHONE UPPER HOUSING

[76] Inventors: Li-Der Cheng, 6F, No. 18, Lane 82, Sec. 7, Chung Shan N. Road, Taipei; Yi-Rong Lee, 7F, No. 382, Hsin Feng Street, Keelung, both of Taiwan

[21] Appl. No.: 09/015,743

[22] Filed: Jan. 29, 1998

[51] Int. Cl.[6] ........................... H04M 17/00; H04M 1/00; G07B 15/00
[52] U.S. Cl. .............................. 379/145; 232/15; 379/437
[58] Field of Search .................................... 379/143, 145, 379/146, 147, 155, 428, 437, 440; 194/202; 232/7, 14, 15

[56] References Cited

U.S. PATENT DOCUMENTS

| | | | |
|---|---|---|---|
| 5,402,476 | 3/1995 | Ohayon | 379/145 |
| 5,509,057 | 4/1996 | Anello et al. | 379/145 |
| 5,524,143 | 6/1996 | Turk et al. | 379/145 |
| 5,555,296 | 9/1996 | McCloskey | 379/145 |
| 5,818,917 | 10/1998 | Anello et al. | 379/145 |

*Primary Examiner*—Paul Loomis

[57] ABSTRACT

A reinforcement pay phone upper housing for mounting to and protecting a pay phone is disclosed, including an outer casing having at least a front panel and two opposite side panels extending from the front panel to be mounted to the upper portion of the pay phone so as to at least cover a portion of a front side and two lateral sides of the upper portion of the pay phone in order to protect the upper portion of the pay phone. An inner plate is arranged inside the outer casing and fixed to an inner surface of the front panel. The inner plate has an opening for mounting dial keys which extend out of the front panel through corresponding openings provided on the front panel. An intermediate reinforced plate is interposed between the inner surface of the front panel and the inner plate, having a reinforced section on which an opening for the dial keys is formed. The section of the intermediate reinforced plate has at least one reinforced zone adjacent the opening for protecting the section from vandalism, such as drilling. Side protection plates may also be provided and fixed to inner surfaces of the side panels of the outer casing. A locking mechanism is provided to be user-operable to releasably secure the upper housing to the pay phone.

5 Claims, 3 Drawing Sheets

REINFORCEMENT PAY PHONE UPPER HOUSING

FIELD OF THE INVENTION

The present invention relates generally to a protective pay phone housing structure and in particular to a reinforced upper housing or cover for a pay phone.

BACKGROUND OF THE INVENTION

Conventionally, some of the pay phones are configured to have an upper portion inside which the electronic and mechanical parts that operate the phone are arranged and protected and a lower portion inside which a coin collection box is disposed for receiving and collecting coins deposited into the phone. The electronic parts that operate the pay phone usually comprise an integrated circuit (IC) chip which is valuable and small in size as compared with other parts of the phone so that it sometimes becomes the target of thieves who damage or destruct the pay phone housing in order to get access to the IC chip.

To provide a protection to the valuable IC chip, a reinforced upper housing of the pay phone has been suggested, such as U.S. Pat. No. 5,509,057, wherein a telephone body guard armor is disclosed. The prior art telephone body guard armor comprises an outer plate and an inner plate both of which are attached to a front side of the pay phone and secured thereto with the inner plate sandwiched between the front side of the pay phone and the outer plate.

Although the prior art telephone body guard armor provides an effective way to prevent the pay phone housing from being destructed or damaged by means of for example drilling, since the outer plate and the inner plate of the prior art pay phone protection device is externally attached to the housing of the pay phone and secured thereto by means of for example threaded studs, it is still possible for the thieves or vandals to destruct the pay phone by forcibly removing the outer and inner protection plates and then directly drilling the phone housing to get access to the IC chip.

Thus, to overcome such a problem, it is desired to provide an improved reinforced pay phone housing structure which is mounted inside the pay phone housing so as to prevent any forcible removal of the reinforcement or protection structure of the pay phone housing.

SUMMARY OF THE INVENTION

Therefor, the principal object of the present invention is to provide a reinforced pay phone upper housing which comprises reinforcement mounted inside the pay phone housing so as to prevent any forcible removal of the reinforcement in attempting to break in the pay phone.

To achieve the above and other objects, in accordance with the present invention, there is provided a reinforced pay phone upper housing structure for mounting to and protecting an upper portion of the pay phone, comprising an outer casing having at least a front panel and two opposite side panels extending from the front panel to be mounted to the upper portion of the pay phone so as to at least cover a portion of a front side and two lateral sides of the upper portion of the pay phone in order to protect the upper portion of the pay phone. An inner plate is arranged inside the outer casing and fixed to an inner surface of the front panel. The inner plate has an opening for mounting dial keys which extend out of the front panel through corresponding openings provided on the front panel. An intermediate reinforced plate is interposed between the inner surface of the front panel and the inner plate, having a reinforced section on which an opening for the dial keys is formed. The section of the intermediate reinforced plate has at least one reinforced zone adjacent the opening for protecting the section from vandalism, such as drilling. Side protection plates may also be provided and fixed to inner surfaces of the side panels of the outer casing. A locking mechanism is provided to be user-operable to releasably secure the upper housing to the pay phone.

BRIEF DESCRIPTION OF THE DRAWINGS

The present invention will be better understood from the following description of a preferred embodiment thereof with reference to the attached drawings, wherein.

DETAILED DESCRIPTION OF THE PREFERRED EMBODIMENT

Figure 1:
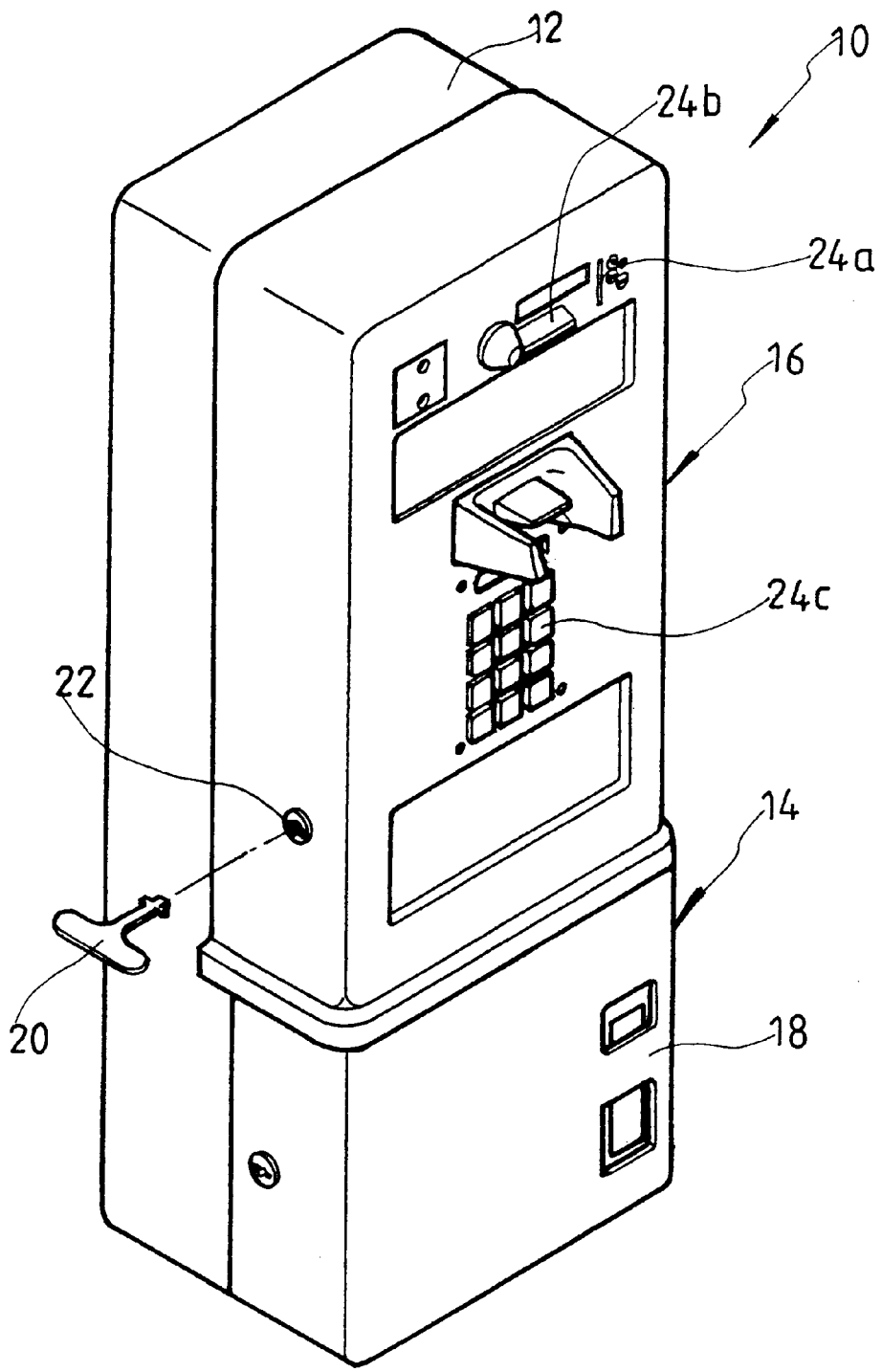
FIG. 1 is a perspective view showing a pay phone in which a reinforcement pay phone upper housing constructed in accordance with the present invention is incorporated.

With reference to the drawings and in particular to FIG. 1, wherein a pay phone, generally designated at 10, incorporating a reinforcement upper housing constructed in accordance with the present invention is shown, comprising a base 12 adapted to be fixed to for example a wall (not shown) to which a front housing 14, comprised of an upper portion 16 and a lower portion 18, is attached to encase therein electronic and mechanical parts (not shown) that operate the phone 10 by means of the upper portion 16 and a coin collection box (not shown) by means of the lower portion 18 thereof. To provide an access to the electronic and mechanical parts encased in the upper portion or upper housing 16, the upper housing 16 is made openable by being operated by a key 20 receivable in a key way 22 formed on the upper housing 16.

Figure 2:
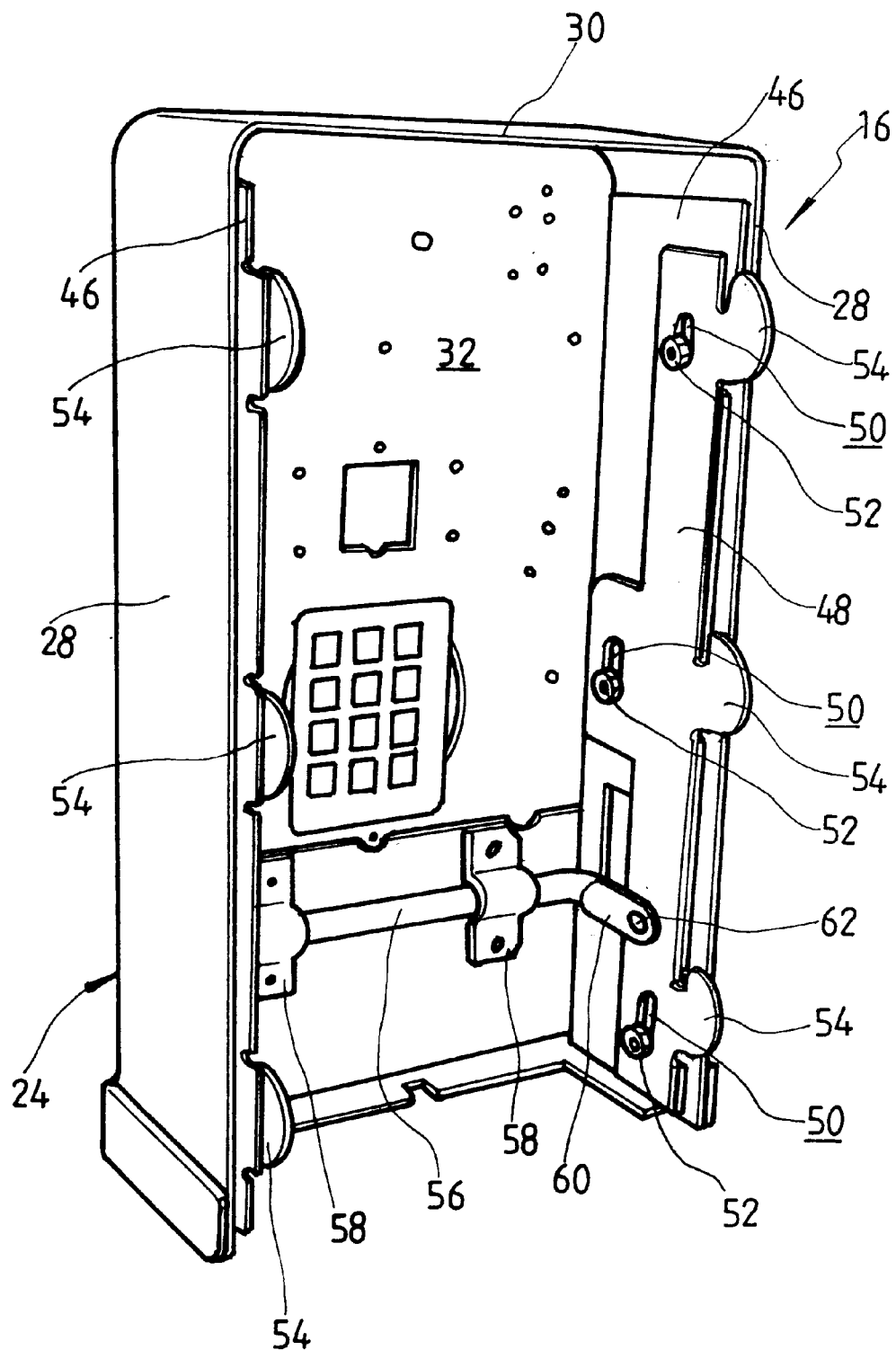
FIG. 2 is a perspective view, observed from the back side, showing the reinforcement pay phone upper housing in accordance with the present invention.
Figure 3:
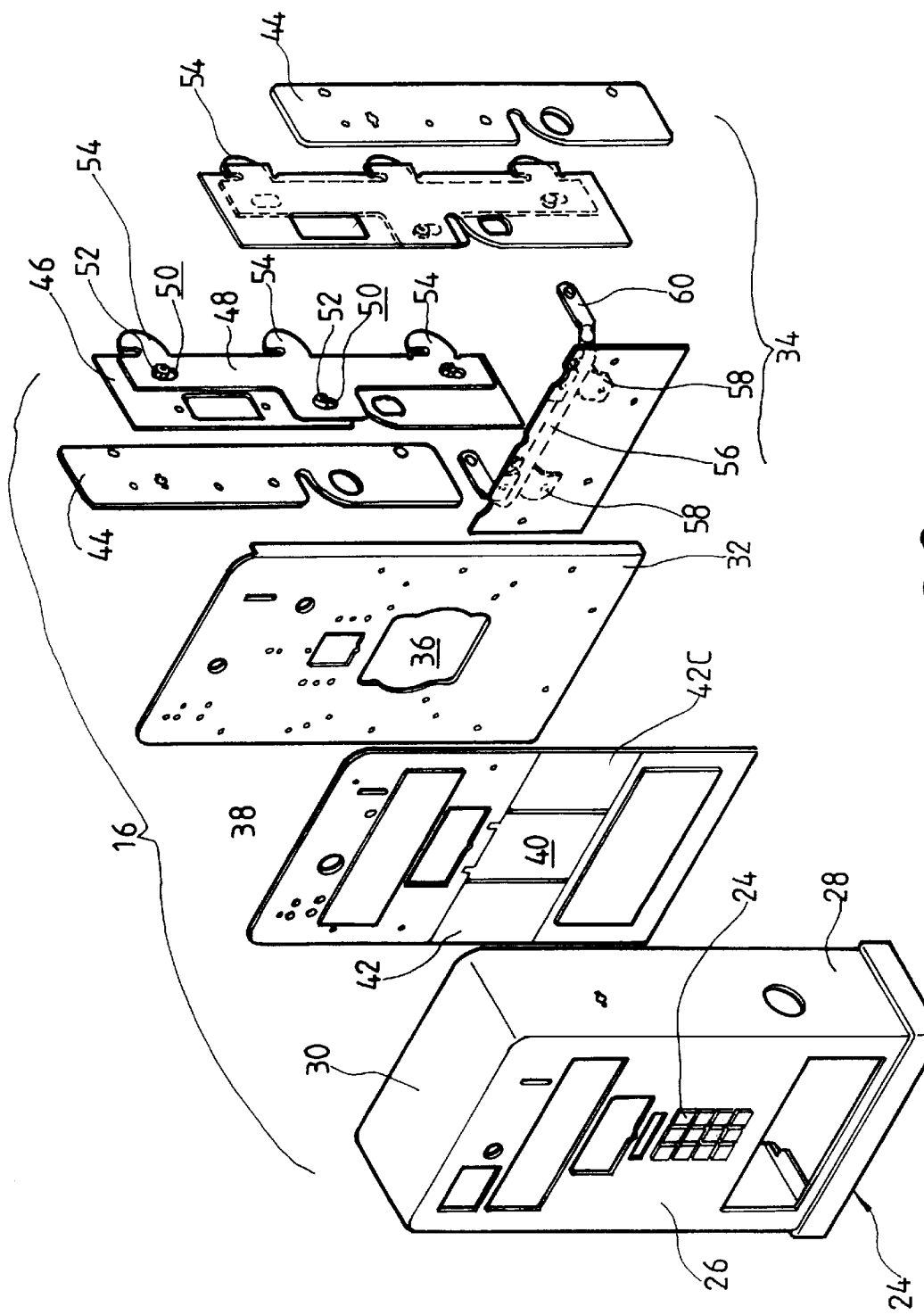
FIG. 3 is an exploded perspective view of the reinforcement pay phone upper housing in accordance with the present invention.

Further referring to FIGS. 2 and 3, which particularly show the structure of the upper housing 16 which embodies the present invention, the upper housing 16 in accordance with the present invention comprises an outer casing 24 on which a plurality of openings of variable sizes are formed for the access of for example coin deposition slot 24a, coin release lever 24b, dial keys 24c or the like that is needed on a regular pay phone. In the embodiment illustrated, the outer casing 24 is configured to have a front panel 26 on which the openings are formed, two side panels 28 extending from the front panel 26 and a top panel 30 also extending from the front panel 26 and connecting between the side panels 28.

The upper housing 16 also comprises an inner plate 32 fixed to an inner surface of the front panel 26 of the outer casing 24, to which a locking mechanism 34 is mounted for releasably securing the upper housing 16 to the phone 10. The inner plate 32 has an opening 36 for mounting the dial keys 24c which extend through the corresponding opening provided on the front panel 26 of the outer casing 24. Due to the openings 36, the mechanical strength of the inner plate 32 is reduced, especially at the section where the opening 36 is formed. Thus, to overcome such a problem, an intermediate reinforcing plate 38 is provided and sandwiched between the inner face of the front panel 26 of the outer casing 24 and the inner plate 32, which comprises a reinforced section on which an opening 40 corresponding to the opening 36 of the inner plate 32 is formed for mounting the dial keys 24c.

In the embodiment illustrated, the reinforced section of the intermediate reinforced plate 38 has two reinforced zones 42 respectively located at two opposite sides of the opening 40 thereof. However, in other embodiments where the opening 40 may be located adjacent to a lateral side of the intermediate reinforced plate 38 so that there may be only one such reinforced zone. The reinforced zones 42 provide a protection against for example drilling and thus breaking in through the weaker section of the inner plate 32.

The reinforced zones 42 may be made by mounting an additional plate thereto or alternatively and preferably in the case that the intermediate reinforced plate 38 is made of a metal that may be heat-treated to increase the hardness, the reinforced zones 42 are formed by means of heat treatment to increase the hardness thereof so as to provide the desired protection.

The reinforcement upper housing 16 may selectively comprise two side protection plates 44 respectively fixed to the inner surfaces of the two side panels 28 of the outer casing 24 for reinforcement and protection of the side panels 28 of the outer casing 24.

The locking mechanism 34 comprises two side support plates 46 which may be respectively fixed to inner surfaces of the two side panels 28 of the outer casing 24 or to the side protection plates 44, if any, and each has a slide plate 48 mounted thereon in such a way to be slidable relative thereto. For example, the slide plate 48 may be provided with at least one elongated slot 50 to receive therein a guide pin 52 fixed to and extending from the respective side support plate 46, as shown in FIG. 3, so as to slidably mount the slide plate 48 to the respective side panel 28.

The slide plates 48 comprises a plurality of hooks 54 formed thereon to be movable with the slide plate between a locked position where the hooks 54 engage corresponding slots (not shown) formed on the pay phone 10 so as to secure the upper housing 16 to the pay phone 10 and a released position where the hooks 54 are disengaged from the slots of the pay phone 10 so as to release the upper housing 16 from the pay phone 10.

One of the slide plates 48 is mechanically coupled to the key way 22 that is formed on the upper housing 16 as shown in FIG. 1 to allow a user or operator to use the key 20 to move the hooks 54 between the locked position and the release position.

A link bar 56 is rotatably supported on the inner plate 32 by means of holders 58 fixed to the inner plate 32 so as to be rotatable about a central axis thereof. The link bar 56 has two end extensions 60 which are respectively pivoted at 62 to the slide plates 48 (FIG. 2) so that the movement of the one of the slide plates 48 that is coupled to the key way 22 may be transmitted to the other one of the slide plates 48 and thus the hooks 54 of both slide plates 48 may be actuated simultaneously.

In accordance with the present invention, the reinforcements, such as the inner plate and the reinforced intermediate plate, are arranged inside the housing of the pay phone so that forcible removal of the reinforcements is not possible. As compared to the externally attached reinforcements adapted in the prior art design, the present invention provides a more effective protection to the housing of the pay phone.

Although the invention has been described by means of the preferred embodiment thereof, it is apparent to those skilled in the art that many changes, variation and modifications are possible without departing from the scope of the invention as defined in the appended claims.

What is claimed is:

1. A reinforcement pay phone upper housing adapted to be mounted to a pay phone, comprising:

an outer casing having at least a front panel and two opposite side panels extending from the front panel adapted to be mounted to an upper portion of the pay phone so as to at least cover a portion of a front side and two lateral sides of the upper portion of the pay phone in order to protect the upper portion of the pay phone;

an inner plate arranged inside the outer casing and fixed to an inner surface of the front panel, the inner plate having an opening for mounting dial keys which extending out of the front panel through corresponding openings provided on the front panel;

an intermediate reinforced plate interposed between the inner surface of the front panel and the inner plate, the intermediate reinforced plate having a reinforced section on which an opening for the dial keys is formed, the reinforced section of the intermediate reinforced plate comprising at least one zone adjacent the opening and reinforced by reinforcement means; and two side protection plates respectively fixed to inner surfaces of the side panels of the outer casing.

2. A reinforcement pay phone upper housing adapted to be mounted to a pay phone, comprising:

an outer casing having at least a front panel and two opposite side panels extending from the front panel adapted to be mounted to an upper portion of the pay phone so as to at least cover a portion of a front side and two lateral sides of the upper portion of the pay phone in order to protect the upper portion of the pay phone;

an inner plate arranged inside the outer casing and fixed to an inner surface of the front panel, the inner plate having an opening for mounting dial keys which extending out of the front panel through corresponding openings provided on the front panel;

an intermediate reinforced plate interposed between the inner surface of the front panel and the inner plate, the intermediate reinforced plate having a reinforced section on which an opening for the dial keys is formed, the reinforced section of the intermediate reinforced plate comprising at least one zone adjacent the opening and reinforced by reinforcement means; and a locking mechanism having two support plates respectively fixed to inner surfaces of the side panels of the outer casing and each having a slide plate slidably mounted thereon to be movable between a locked position and a released position, each of the slide plates having a plurality of hooks fixed thereon and engageable with corresponding slots provided on the pay phone when the slide plates are at the locked position and disengaged from the slot when the slide plates are at the released position so as to releasably secure the upper housing to the pay phone.

3. The reinforcement pay phone upper housing as claimed in claim 2, wherein the locking means further comprises a link bar connected between the two slide plates to have the two slide plates moving simultaneously.

4. The reinforcement pay phone upper housing as claimed in claim 2, wherein the locking means comprises a user-operated actuation means for moving the slide plates between the locked position and the released position.

5. The reinforcement pay phone upper housing as claimed in claim 4, wherein the user-operated actuation means comprises a key insertable into a key way formed on the outer casing, the key way being mechanically coupled to the slide plates for moving the slide plates between the locked position and the released position.

* * * * *